Feb. 6, 1934.                H. J. MALLON                1,945,698
                AIRCRAFT TRAINING AND SPORT APPARATUS
                     Filed June 15, 1933         3 Sheets-Sheet 1
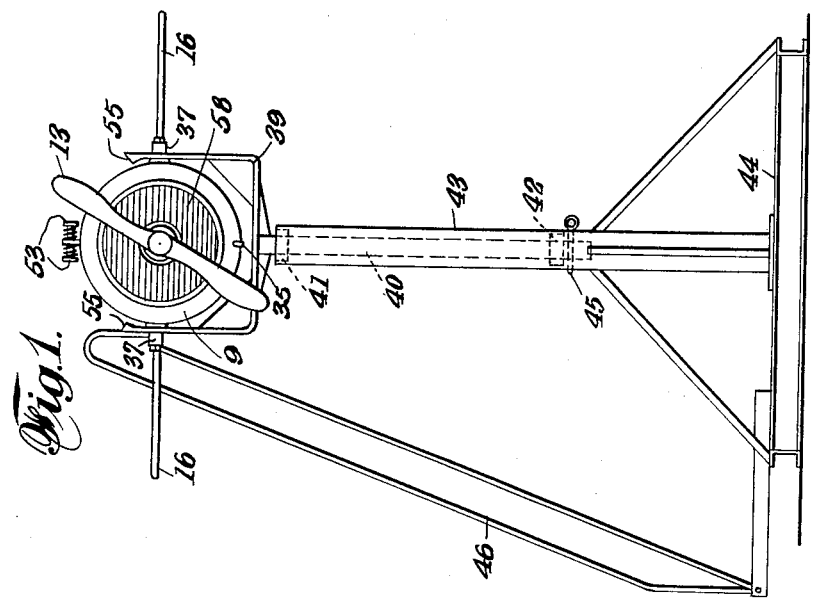
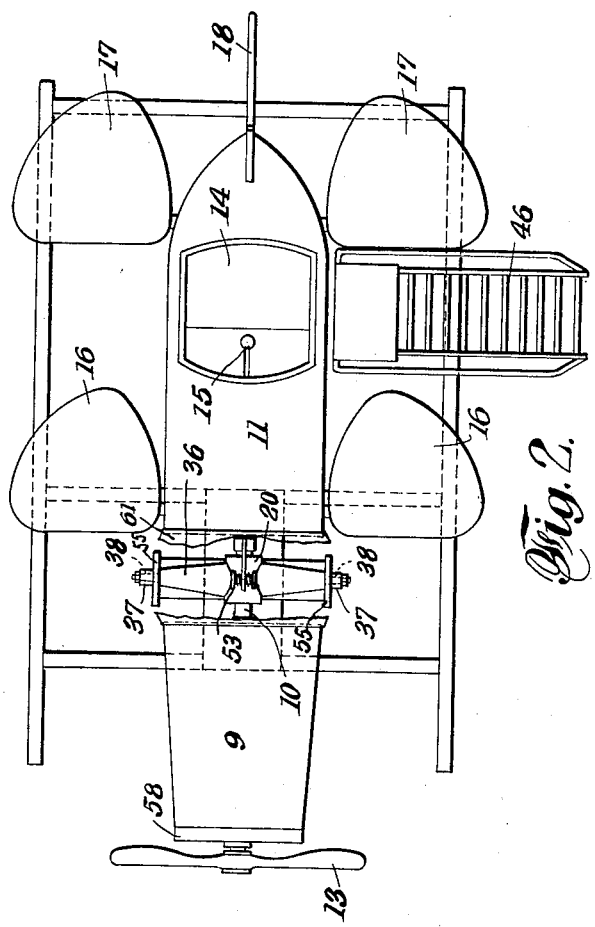
INVENTOR.
HUGH J. MALLON
BY
ATTORNEY

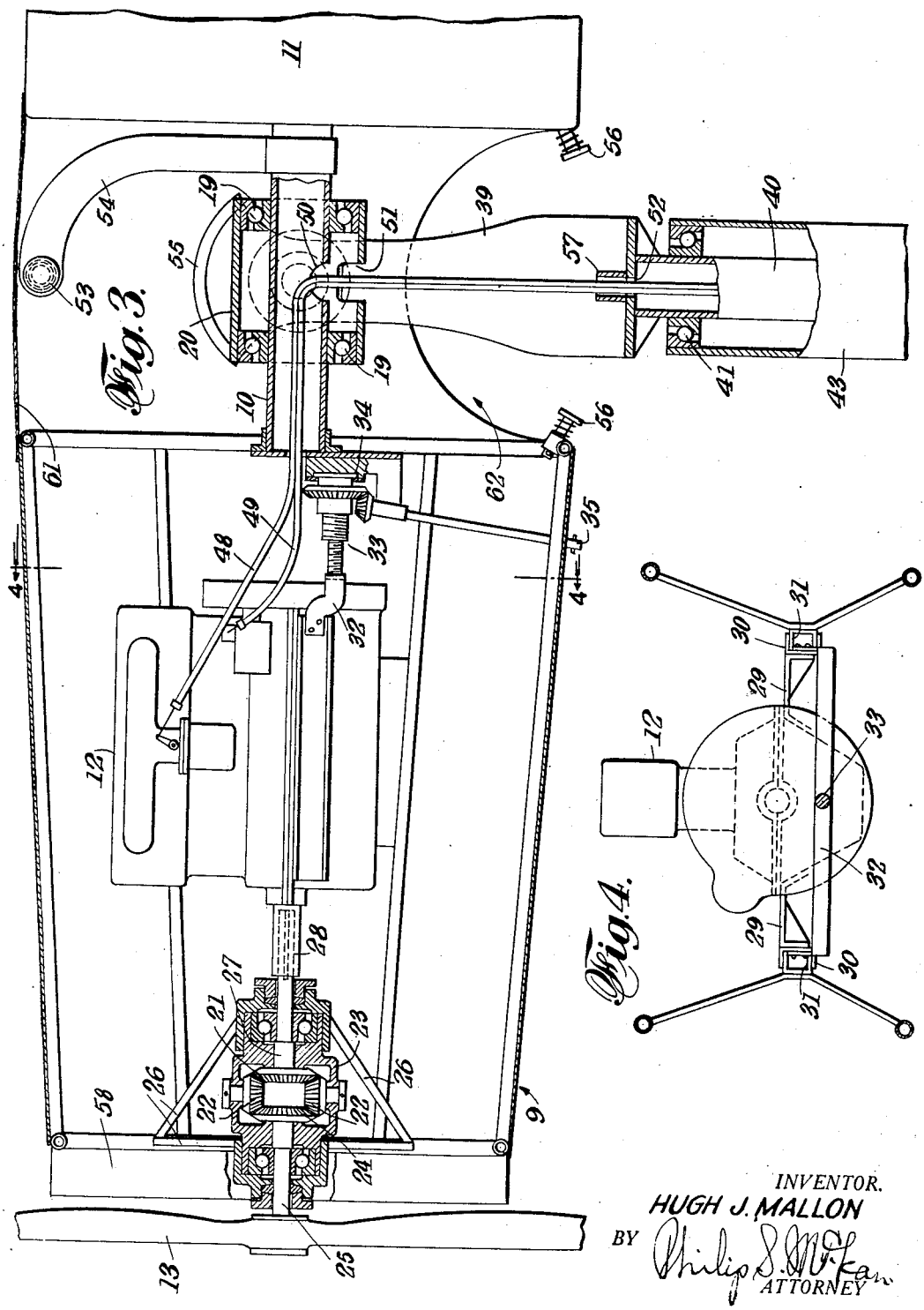

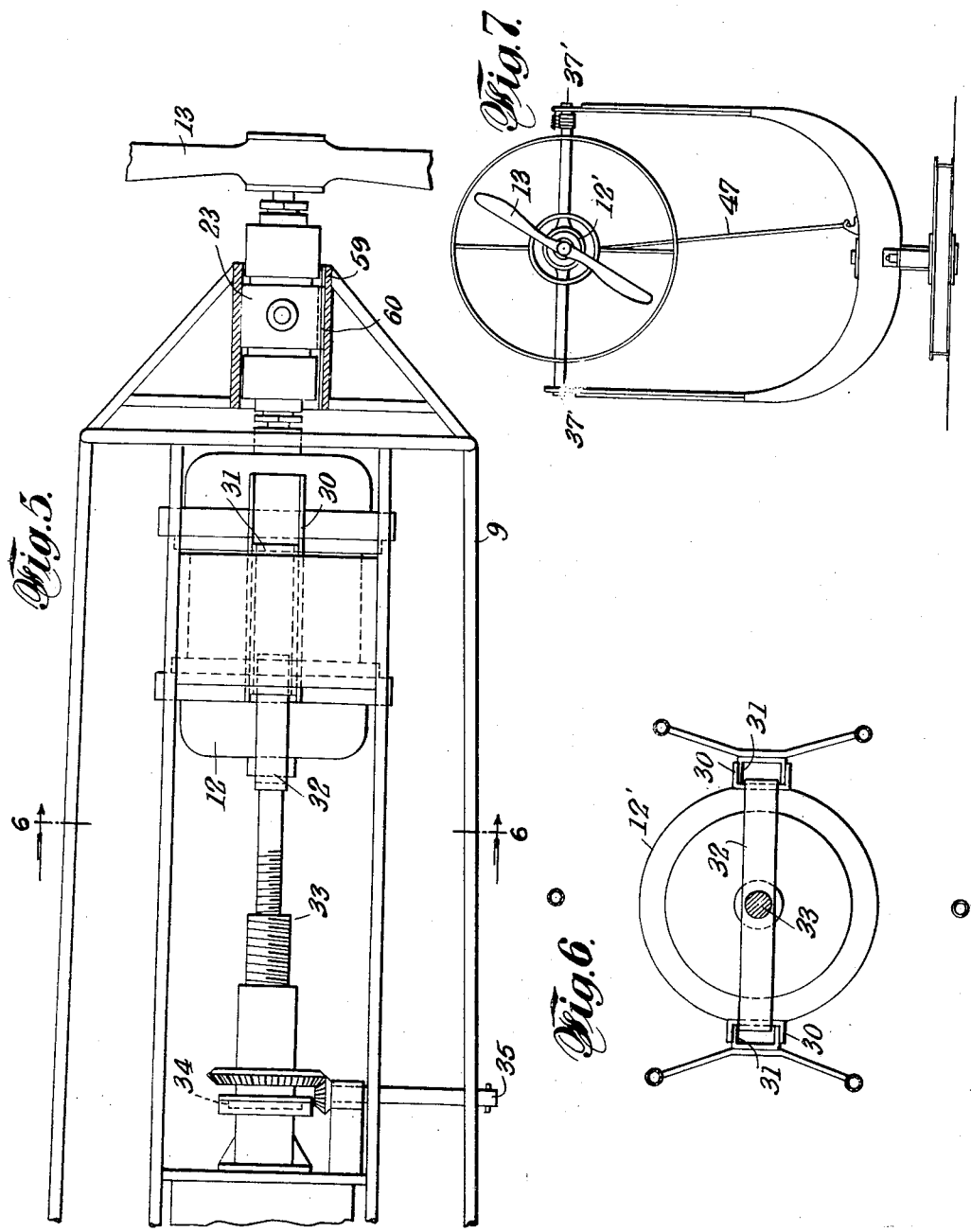

Patented Feb. 6, 1934

1,945,698

UNITED STATES PATENT OFFICE 1,945,698

AIRCRAFT TRAINING AND SPORT APPARATUS

Hugh James Mallon, New York, N. Y.

Application June 15, 1933. Serial No. 675,901

18 Claims. (Cl. 35—12)

The objects of this invention are to provide aircraft training and amusement apparatus of as simple and inexpensive construction as possible, utilizing standard automotive parts so far as practicable, capable of simulating the movements and responding to the controls of free aircraft sufficiently for primary training and amusement purposes and in which the motor will move with the fuselage structure, as in regular aircraft and the gyroscopic effects of the propeller and moving parts of the motor will be automatically compensated for.

These and other desirable objects are attained by the novel features of construction, combinations and relations of parts hereinafter described and broadly claimed.

The drawings accompanying and forming part of the specification illustrate certain practical embodiments of the invention, with the understanding that the structure may be modified as regards the present disclosure all within the true intent and broad scope of the invention.

Fig. 1 is a front elevation and Fig. 2 is a plan view of a form of the apparatus using an ordinary internal combustion engine for the propeller which creates the air stream; Fig. 3 is a broken longitudinal sectional view illustrating particularly the forward motive power end of the apparatus; Fig. 4 is a broken cross-sectional view substantially as on line 4—4 of Fig. 3; Fig. 5 is a view similar to Fig. 3 of another embodiment of the invention, utilizing an electric motor as the driving force; Fig. 6 is a cross-sectional view of the same as on line 6—6 of Fig. 5; Fig. 7 is a front view of the form of the apparatus shown in Fig. 5.

The apparatus of the present invention embodies in the illustration a fuselage structure made up of a forward motor carrying section 9, Fig. 2, connected by a rigid tubular strut or stay 10, with a rearward passenger carrying section 11.

In the front or nose portion of the fuselage, a motor 12 is located driving a propeller 13, for creating an air stream and the rearward section carries a compartment or compartments 14, for one or more passengers with a suitable control or controls 15, preferably simulating those of ordinary aircraft and arranged to actuate control surfaces, such as ailerons 16, elevators 17 and rudder 18, in the slip stream of the propeller.

The tubular connecting member 10, forming in effect the backbone of the fuselage may be centrally located as indicated and is journalled to enable the fuselage to have a rolling movement on its axis as by means of spaced anti-friction bearings 19, Fig. 3, in opposite ends of a surrounding sleeve 20.

The gyroscopic effects of the propeller and the moving parts of the motor are automatically compensated for in the present invention by driving the propeller from the motor through a gear system in the nature of differential gearing, here illustrated as consisting of a motor driven bevel gear 21, driving one or more differential bevel pinions 22, journalled in a differential cage or casing 23, fixed to the fuselage frame and which pinions mesh with a bevel gear 24, on the propeller shaft 25. The pinion cage being fixed to the fuselage as by braces and other frame structure 26, it follows that the propeller turns in opposite direction from the motor shaft and that by proper relation of the gearing, the gyroscopic effects of the moving parts of the motor will be effectively compensated and balanced without loss of power and without use of brakes, springs or air stream deflecting contrivances, which detract from the responsiveness of the device to the air stream.

The shaft 27 which carries the motor driven gear 21 is shown as having a sliding splined connection with the motor shaft at 28, for the purpose of enabling bodily longitudinal adjustment of the motor without shifting the counter torque balancing or propeller mechanism. Such bodily shifting of the motor is desirable at times to balance the passenger weight and this is effected in the illustration, Figs. 3 and 4, by providing the motor base 29 with outwardly facing channel rails 30, which slide over the inwardly faced channel rails 31, and by the connection of this sliding frame at 32, with a screw jack 33, supported on the fuselage frame at 34, and having an actuating shaft exposed at the bottom of the fuselage at 35.

Tilting movements of the fuselage, corresponding to ascending and descending air travel are provided for in the illustration by constructing the mounting sleeve 20, with horizontally extending arms 36, journalled at the outer ends in bearings 37. These bearings may be and are indicated as ordinary automobile wheel bearings receiving automobile wheel spindles 38, attached to or forming the ends of the arms 36, such construction enabling the utilization of standard automobile parts.

For horizontal steering movements, the entire structure is shown as supported in a generally U-shaped yoke 39, the wheel bearings 37 being directly supported in the upstanding arms of said yoke and the spindle 40 of the yoke being journalled by upper and lower bearings 41 and 42, in a hollow column 43, solidly braced or mounted on a suitable base or platform 44, Fig. 1.

A pin 45 entered through corresponding openings in the hollow column and stem of the yoke serves to lock the apparatus against turning when passengers are being loaded or unloaded as by a ladder or gangway 46, and the fuselage itself at such times may be held against rolling or tipping movements as by the brace construction disclosed in copending application, Ser. No. 629,586 and illustrated in a general way at 47, Fig. 7 in this disclosure.

The internal combustion engine is desirable as a source of power because of its independence from power lines and the like, flexibility and control, cheapness of operation and because further of the similarity of sound and control effects to regular aircraft. The engine controls, such as indicated at 48, 49, Fig. 3, may be brought out through the tubular backbone to the cockpit of the fuselage for direct operation of the student or occupant, or these controls may be extended down through appropriate openings 50, 51, 52, in the backbone member 10, mounting sleeve 20 and yoke 39, and brought out through the foot of the yoke to a suitable outside control station.

For ordinary training or amusement purposes, the various movements may be limited, for example to 45° more or less. Thus in the illustration, the rocking or rolling movements are limited by means of spring buffers 53, carried by an arm 54, projected up from the sleeve 10 to engage stop shoulders 55 on the upper ends of the yoke and which are indicated in Fig. 3 as of arcuate form, to serve irrespective of the tilting movements of the fuselage, said spring buffers being disposed in vertical alignment with the center of tilting movement as indicated in Fig. 3. In this same view, the tilting movement is shown as governed by spring stop plungers 56, on the fore and aft sections of the fuselage at opposite sides of the yoke and positioned to engage the abutment sleeve 57 at the center of the yoke. If desired, similar means may be provided for limiting the horizontal turning movement of the fuselage by means of cooperating stops for the vertically pivoted yoke.

The gearing interposed between the motor and propeller may be of the same general design found in automobile rear axles and it is intended at present to utilize, so far as possible, these standard automotive parts, the gearing shown in Fig. 3, being of this character with the casing 23, substituted for the so-called ring in which the differential pinions are usually mounted in an automobile rear axle.

In the case of a water cooled engine, such as indicated, the radiator for the same may be mounted in the nose of the fuselage back of the propeller, as indicated at 58.

Where electric power is preferred, an electric motor may be used as indicated at 12', Fig. 5, this being adjustable in the same way as heretofore described and driving the propeller through a gear unit as first described.

A wide tall yoke U-shaped mounting may be employed, if desired, such as disclosed in the companion application Ser. 629,586 in place of the smaller yoke first shown here in Fig. 1. This alternate construction is indicated in Fig. 7, the yoke being wide enough and tall enough to permit complete rotation of the fuselage on the horizontal axis at 37', if that be desired.

In the electric motor installation illustrated in Fig. 5, the gear casing is indicated as coupled to slide longitudinally with the motor, it being shown as capable of sliding movement in a surrounding bearing 59 on the fuselage and as slidingly keyed in said bearing as at 60.

The supporting of the fuselage structure by the longitudinal shafting in the intermediate portion of the fuselage provides an easily balanced mounting for the structure and a simple compact arrangement, which does not mar the aircraft appearance of the device. The bearing at 20 for this piece of shafting need not be much larger in diameter than the shaft and the fuselage sections connected by the shaft may be joined together or faired over to some extent to give the effect of a continuous fuselage body. Suitable fairing such as indicated at 61 in Figs. 2 and 3 may be provided between the forward and rearward fuselage sections, slotted at opposite sides as indicated at 62, Fig. 3, to allow for the movements of the fuselage and preferably readily removable to enable inspection of the main bearings, etc. This fairing passes the air stream to the control surfaces without disrupting the flow and enhances the appearance and the slot or opening 62, at the underside need not be objectionably noticeable.

What is claimed is:

1. Apparatus of the character disclosed, comprising a fuselage structure mounted to rotate on a longitudinal axis, adjustable control surfaces carried by said structure, a motor mounted to rotate with said fuselage structure, a propeller driven by said motor through a direction reversing drive.

2. In combination, a fuselage structure provided with variable control surfaces, means for mounting said fuselage structure for rolling on a longitudinal axis, a motor carried by said fuselage structure and exerting a counter torque effect thereupon, a propeller driven by said motor through a direction reversing drive and creating an air stream on said control surfaces, said direction reversing drive being connected to apply torque effect to said fuselage structure.

3. In combination, a fuselage structure having control surfaces, means for mounting said structure for movement in various directions, a propeller mounted on said structure for creating an air stream effective on the control surfaces, a motor mounted on the fuselage structure and exerting counter torque thereon and drive connections from the motor to the propeller and including gearing for reversing the direction of propeller rotation with respect to the motor and connected to apply the reaction of the reversing to the fuselage structure.

4. In combination, a fuselage structure mounted for rolling movements, a motor longitudinally adjustable in said fuselage structure, a propeller, driven by said motor through a direction reversing drive including a slip connection enabling adjustments of said motor with respect to said drive.

5. In combination, a fuselage structure, means for mounting same for movement in various directions, an internal combustion engine mounted in said fuselage structure, a propeller mounted on the structure for creating an air stream thereover and driven from said motor through a direction reversing drive connected to apply the reaction of the reversing to the fuselage.

6. In combination, a yoke journalled on a vertical axis, a sleeve member mounted for tilting movements in the arms of said yoke, a tubular member journalled in said sleeve member, motor and passenger fuselage sections carried by said tubular member at opposite ends of said supporting sleeve, a motor mounted in the motor section, a propeller driven by said motor and variable control surfaces carried by the passenger fuselage section.

7. In combination, a yoke journalled on a vertical axis, a sleeve member mounted for tilting movements in the arms of said yoke, a tubular member journalled in said sleeve member, motor and passenger fuselage sections carried by said tubular member at opposite ends of said supporting sleeve, a motor mounted in the motor section, a propeller driven by said motor, variable control surfaces carried by the passenger fuselage section, said motor being an internal combustion engine and flexible controls therefor extending from the motor fuselage section through the tubular mounting member.

8. In combination, fore and after fuselage sections, a backbone member rigidly connecting the same, means for rotatably supporting said backbone member, a motor and propeller carried by the forward fuselage section and passenger operable control surfaces carried by the rearward fuselage section.

9. In combination, fore and aft fuselage sections, a backbone member connecting the same, means for rotatably supporting said backbone member, a motor and propeller carried by the forward fuselage section, passenger operable control surfaces carried by the rearward fuselage section and yielding stop means for limiting the movements of said fuselage structure.

10. In combination, a vertically pivoted yoke having arcuate stop shoulders on the arms of the same, a fuselage structure pivotally mounted in said yoke and having stop means in line with the pivotal mounting of the same for cooperation with said arcuate stop shoulders on the yoke arms, control surfaces carried by said fuselage structure and means on the fuselage structure for creating an air stream on said control surfaces.

11. In combination, a fuselage structure having motor and passenger sections and mounting shafting intermediate and rigidly connecting said sections, a supporting bearing engaged with said shafting and whereby both sections of said fuselage structure are supported rotatably on a longitudinal axis, a horizontally extending support for mounting said bearing for tilting movements of the fuselage structure and a support pivoted for movement about a vertical axis and pivotally supporting the horizontally extending support of the fuselage supporting bearing.

12. In combination, a fuselage structure having motor and passenger sections and mounting shafting intermediate and rigidly connecting said sections, a supporting bearing engaged with said shafting and whereby both sections of said fuselage structure are supported rotatably on a longitudinal axis, a horizontally extending support for mounting said bearing for tilting movements of the fuselage structure, a support pivoted for movement about a vertical axis and pivotally supporting the horizontally extending support of the fuselage supporting bearing, a motor in the motor section of the fuselage, a propeller, driven by said motor through a direction reversing drive having a connection with the fuselage structure and variable control surfaces operably mounted on the passenger section of the fuselage.

13. In combination, a fuselage structure, means for movably supporting the same, a motor mounted on the fuselage, means for bodily shifting the motor for balancing the fuselage, a propeller and reversing gearing interposed between the motor and propeller and having connection with the motor and the fuselage in the various positions of adjustment of the motor.

14. In combination, a fuselage structure, means mounting the same for rotary movements about the longitudinal axis, a motor carried by said fuselage structure, variable control surfaces on the structure, a propeller for creating an air stream on said control surfaces and propeller reversing drive gearing from the motor to the propeller, including direction reversing gearing mounted to apply the reversing reaction to the fuselage structure in opposition to the counter torque exerted by the moving parts of the motor.

15. In combination, a fuselage structure slotted in the underneath and side portions intermediate the length of the same, a mounting yoke entered through said slotted underportion of the fuselage, a support journalled horizontally in said mounting yoke and a backbone structure for the fuselage journalled to an intermediate portion of said supporting member.

16. Aircraft training and amusement apparatus, comprising supporting shafting, a bearing rotatably supporting said shafting, motor and passenger fuselage sections fixed on and carried by said shafting at opposite sides of the bearing supporting the same, means for mounting said bearing for tilting movements of the same and including pivotal supporting means enabling horizontal swinging movements of the shafting and fuselage, a propeller and a motor for driving the same mounted in the motor fuselage section aforesaid and passenger seating and control means in the passenger fuselage section.

17. Aircraft training and amusement apparatus, comprising supporting shafting, a bearing rotatably supporting said shafting, motor and passenger fuselage sections fixed on and carried by said shafting at opposite sides of the bearing supporting the same, means for mounting said bearing for tilting movements of the same and including pivotal supporting means enabling horizontal swinging movements of the shafting and fuselage, a propeller and a motor for driving the same mounted in the motor fuselage section aforesaid and passenger seating and control means in the passenger fuselage section, the separated fuselage sections at opposite sides of the supporting bearing being connected by fairing covering the supporting shafting and bearing therefor.

18. Aircraft training and amusement apparatus, comprising supporting shafting, a bearing rotatably supporting said shafting, motor and passenger fuselage sections fixed on and carried by said shafting at opposite sides of the bearing supporting the same, means for mounting said bearing for tilting movements of the same and including pivotal supporting means enabling horizontal swinging movements of the shafting and fuselage, a motor for driving a propeller mounted in the motor fuselage section aforesaid, a propeller driven by said motor through a direction reversing drive, connected with said motor fuselage section and passenger seating and control means in the passenger fuselage section.

HUGH J. MALLON.